United States Patent
Niemczyk

(10) Patent No.: US 11,310,974 B2
(45) Date of Patent: Apr. 26, 2022

(54) SOIL VENTING ARRANGEMENT AND METHOD FOR INCREASING THE RATE OF GROWTH OF TREES

(71) Applicant: Andrew Niemczyk, Hazel Park, MI (US)

(72) Inventor: Andrew Niemczyk, Hazel Park, MI (US)

(*) Notice: Subject to any disclaimer, the term of this patent is extended or adjusted under 35 U.S.C. 154(b) by 458 days.

(21) Appl. No.: 16/240,910

(22) Filed: Jan. 7, 2019

(65) Prior Publication Data

US 2019/0208721 A1 Jul. 11, 2019

Related U.S. Application Data

(60) Provisional application No. 62/614,538, filed on Jan. 8, 2018.

(51) Int. Cl.
*A01G 29/00* (2006.01)
*A01G 7/06* (2006.01)
*A01G 23/00* (2006.01)

(52) U.S. Cl.
CPC ............ *A01G 29/00* (2013.01); *A01G 7/06* (2013.01); *A01G 23/00* (2013.01)

(58) Field of Classification Search
CPC .......... A01G 29/00; A01G 7/06; A01G 23/00; G21G 1/0005; B09C 2101/00; B09C 1/00
USPC ......... 47/58.1 SC, 32.7, 32.8, 48.5, DIG. 10; 405/43, 36, 38, 78, 50
See application file for complete search history.

(56) References Cited

U.S. PATENT DOCUMENTS

| | | | | |
|---|---|---|---|---|
| 5,975,797 A * | 11/1999 | Thomas | ............... | A01G 25/06 405/36 |
| 7,338,359 B2 * | 3/2008 | Grossman | ............... | F24F 7/02 34/233 |
| 8,065,832 B2 * | 11/2011 | King | ............... | A01G 29/00 47/48.5 |
| 8,562,250 B2 * | 10/2013 | Niemczyk | ............... | E03F 1/002 405/48 |
| 10,736,252 B2 * | 8/2020 | Niemczyk | ............... | A01B 35/16 |
| 2008/0083175 A1 * | 4/2008 | Niemczyk | ............... | E02D 31/02 52/169.5 |
| 2012/0260568 A1 * | 10/2012 | King | ............... | A01G 29/00 47/48.5 |
| 2014/0194053 A1 * | 7/2014 | Carroll | ............... | F24F 13/20 454/367 |
| 2019/0208694 A1 † | 7/2019 | Andrew | | |

FOREIGN PATENT DOCUMENTS

| | | | | |
|---|---|---|---|---|
| AU | 2010237023 B2 † | 12/2011 | | |
| FR | 2569215 | * | 2/1986 | ............ E02B 11/005 |

* cited by examiner
† cited by third party

*Primary Examiner* — Andrea M Valenti
(74) *Attorney, Agent, or Firm* — John R Benefiel

(57) ABSTRACT

A method for dispersing nutrients from deep subsoil below the depth of soil in which tree roots are growing to increase the growth rate of the trees, which member directs gaseous fluid collected from the deep subsoil into the root zone soil where the tree roots are growing.

1 Claim, 7 Drawing Sheets

SOIL VENTING ARRANGEMENT AND METHOD FOR INCREASING THE RATE OF GROWTH OF TREES

CROSS REFERENCE TO RELATED APPLICATIONS

This application claims the benefit of U.S. provisional patent application No. 62/614,538 filed on Jan. 8, 2018.

BACKGROUND OF THE INVENTION

This invention concerns plant husbandry and in particular increasing the rate of growth of established trees grown for fruits, nuts, etc., and for landscape design.

The rate of growth of trees typically gradually declines.

It is believed that this decline is caused by depletion over time of one or more trace elements in the soil which are necessary for vigorous growth of the tree. The identity of such depleted trace elements is difficult or impractical to determine.

Also, the soil level in which the roots grow close to the surface is usually compacted which also inhibits root growth and also blocks gaseous fluids containing trace elements to naturally rise up into the root zone.

Most trees do not grow roots below a relatively shallow depth below the ground surface, typically only two or three feet down. Trace elements after a time may become depleted in the soil in which the roots are growing, and so are not available to the trees even though they are still be present in the deeper soil below the root zone. The fact there are trace elements necessary for good growth which have become depleted in the root zone soil is usually not realized, so that to simply replace particular depleted trace elements is not considered as a remedy. Thus, after a few years, trees frequently do not thereafter grow at a vigorous rate.

It is an object of the present invention to provide a subsoil venting arrangement and method for making such depleted trace elements available to the tree roots by causing gaseous fluids containing trace elements to rise up from deeper soil depths and into the root zone in order to restore the vigor of trees growing in such depleted soil.

SUMMARY OF THE INVENTION

The above object and other objects which will be appreciated by those skilled in the art are achieved by installing a venting arrangement into the subsoil at a depth well beneath the soil level where the roots of trees grow. The venting arrangement is configured to collect fluids such as gases and vapors from these deeper subsoil levels well below the depth of the root zone which still contain such trace elements. The collected fluids are transmitted up into the soil where the tree roots are present so as to be dispersed therein to replace the depleted elements in that soil. The trace element or elements are thus again made available to be absorbed by the trees to thereby restore the vigor and growth rate of the trees.

The venting arrangement is comprised of an array of vertically oriented elongated vent members installed in the subsoil, each preferably constructed of a durable material able to remain in the soil for many years without substantial deterioration. Extruded polypropylene plastic is satisfactory for this purpose.

The length of the vent members is sufficient to extend well down into the deep soil beneath the root zone with an upper end extending into the root zone.

The vent members preferably include a plurality of lengthwise slotted outer tube portions arranged around a central slotted tube portion. All of the tube portions are preferably integrally joined together, as by an extrusion process simultaneously forming all of the tube portions integrally attached to each other. The gases and vapors otherwise trapped in the deep subsoil pass through the slots of the outer and central tube portions and are received into the interior of each of the tubular portions and thereafter are able to rise up and out of a top end of the slotted tubular portions.

A cap is placed over the top end of each of the vent members to capture the gases and/or vapors transmitted up the tubular portions of the vent members where a slight pressurization of the collected gas and/or vapors develops. The vapor and/or gas fluids thereafter flow out of the cap around the bottom end of each cap.

An array of exterior lengthwise slots is formed into a series of outer chambers extending lengthwise up the exterior of the cap. The gas/vapors are received into the exterior chambers and flow up therein, passing out all along the slots to be thereby dispersed into the root zone. The trace elements are thus made present in the root zone and thereby made available to the roots of the trees. This flow of gases/vapors thereby restores the presence of the depleted elements in the root zone of the soil and thereby the vigor and natural growth rate of the trees growing in that soil when the needed nutrients are provided.

DESCRIPTION OF THE DRAWING FIGURES

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
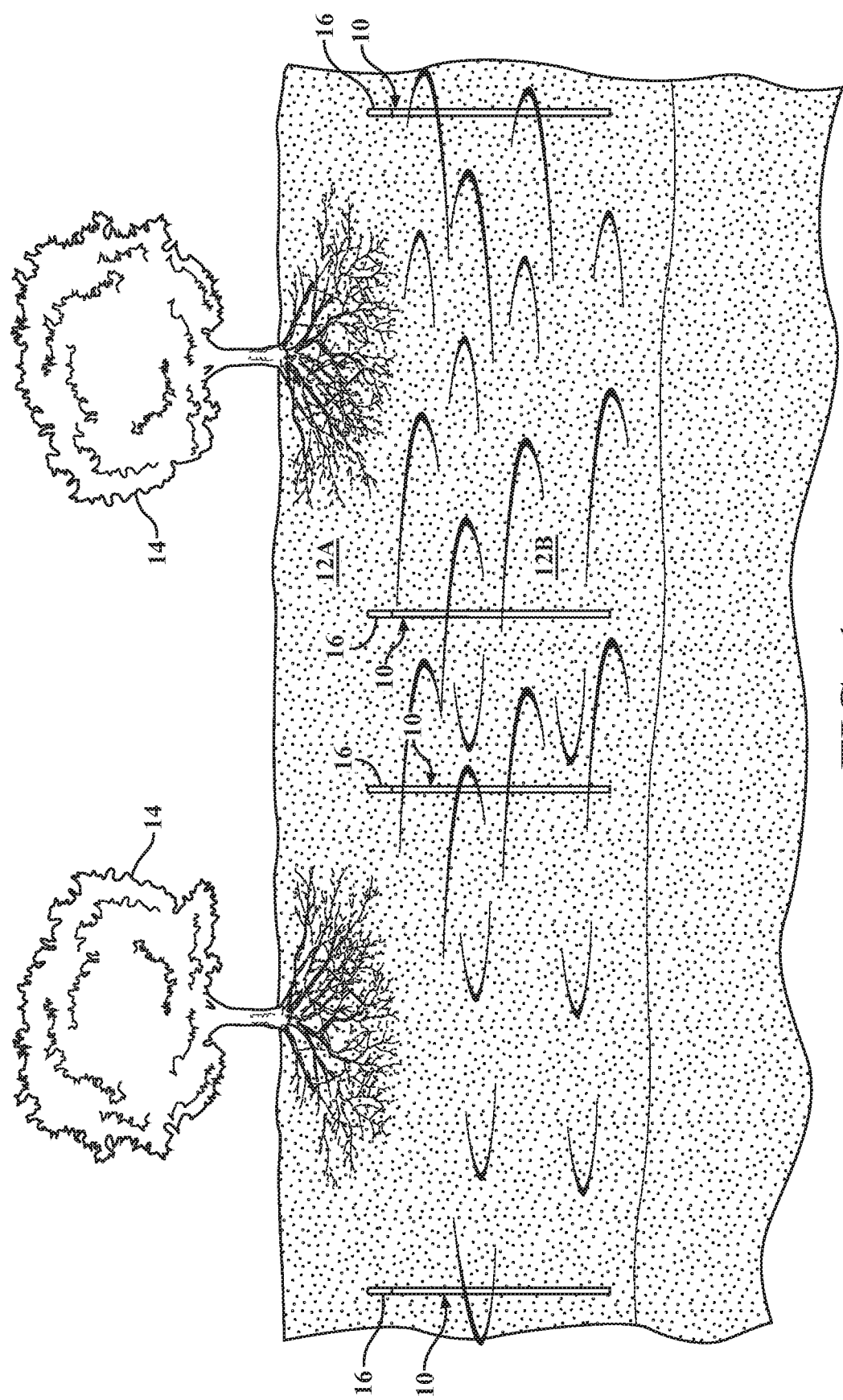
FIG. 1 is a view of a soil section having roots of trees growing therein with an array of vent members installed in a vertical orientation in the soil at a depth well below the root zone, the upper end of each vent member having a cap assembled thereon and extending up into the root zone.

Referring to FIG. 1, the present invention includes vertically oriented elongated vent members 10 which are installed in holes drilled in the subsoil below the root zone 12A of a group of trees 14.

The vent members 10 are of a length sufficient to extend well down below the root zone 12A into a virgin subsoil region 12B. However, the upper end 16 of each of the vent members 10 extends into the root zone 12A.

Figure 2:
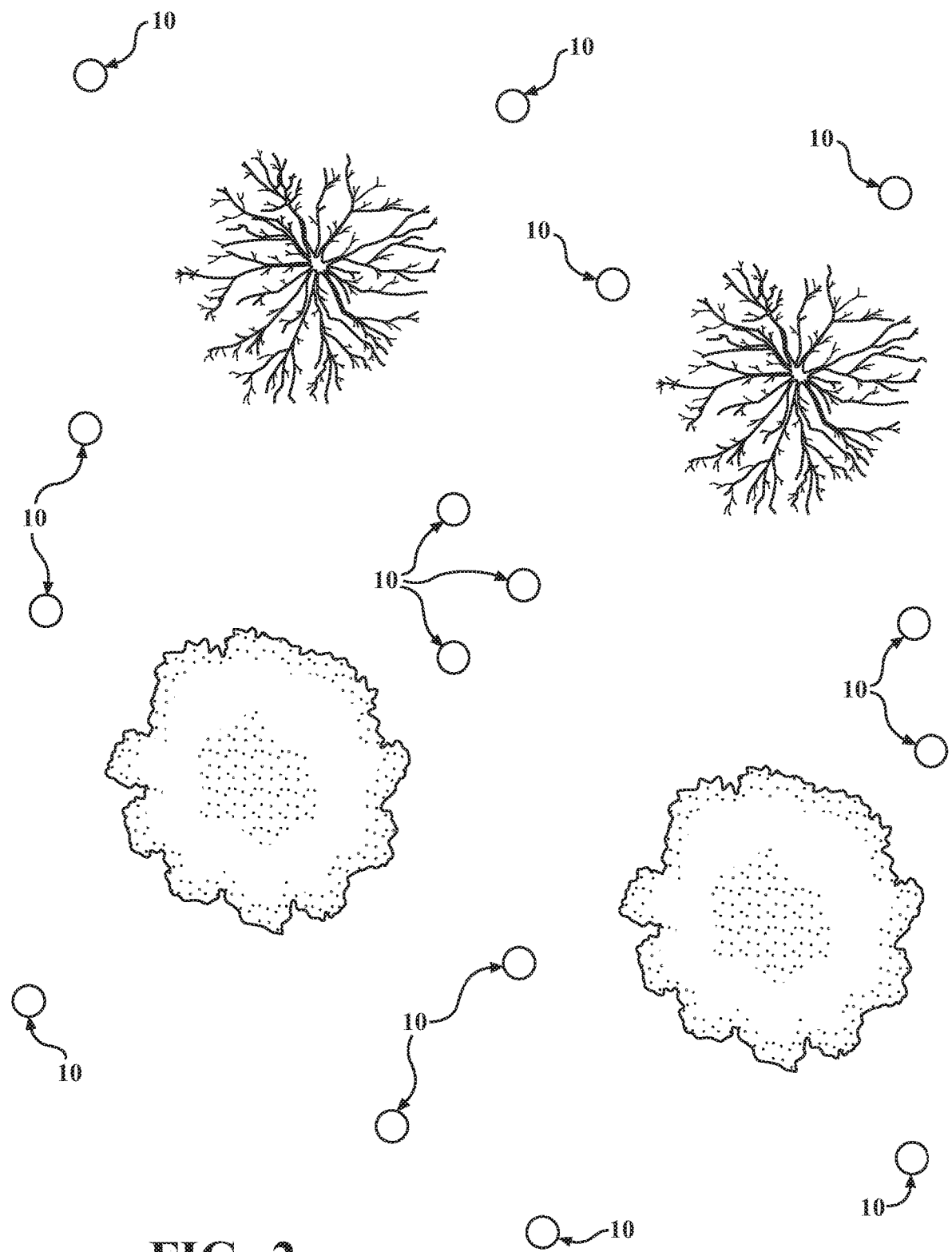
FIG. 2 is a plan view of a group of trees depicting an array of vent members each with a respective cap on the upper end thereof disposed around the roots of the trees.

As seen in FIGS. 1 and 2, the vertically oriented vent members 10 are located disposed around the perimeter of the roots of the trees 14.

Figure 3A:
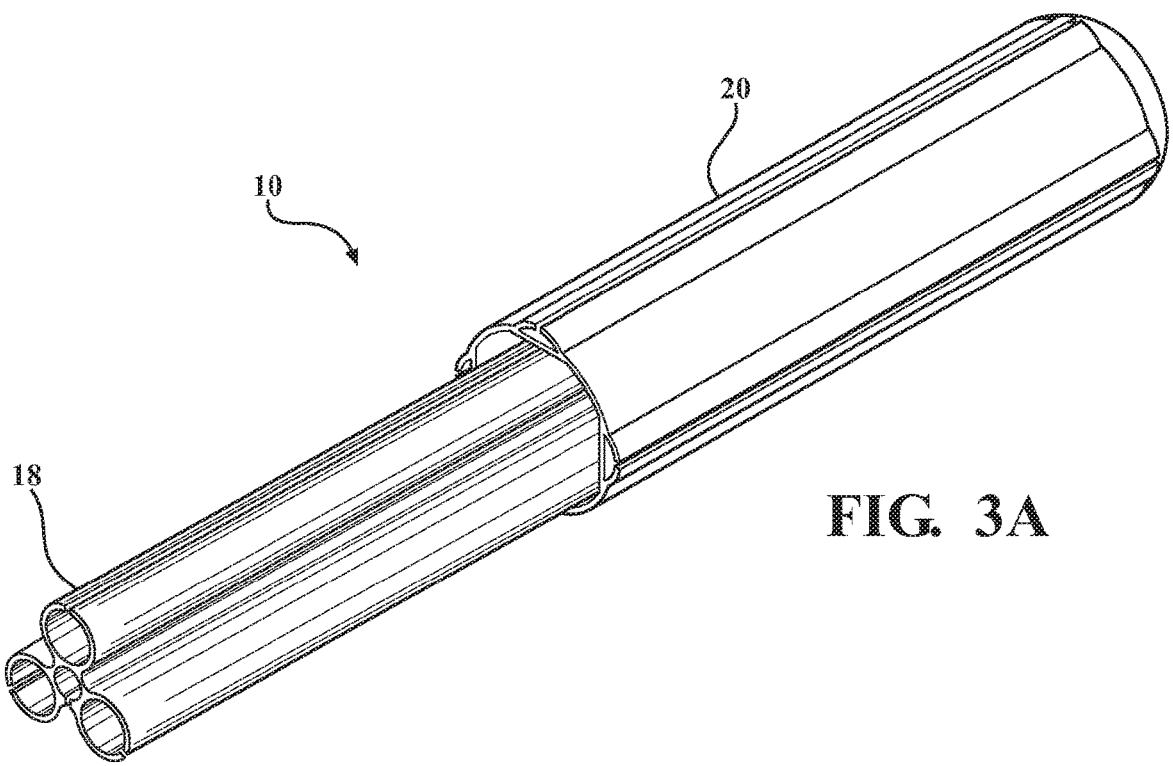
FIGS. 3A and 3B are perspective views from two different angles of a vent member according to the present invention, with the vent member shown truncated.
Figure 3B:
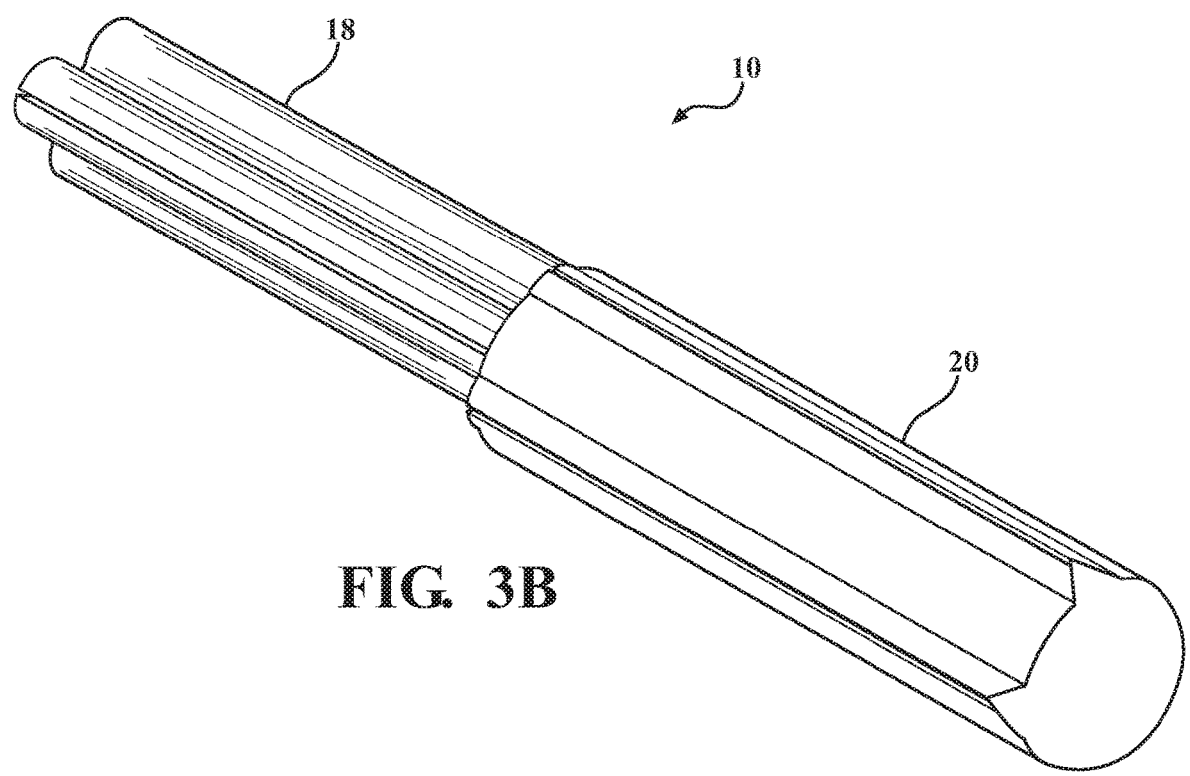

Referring to FIGS. 3A and 3B, each of the vent members 10 includes an elongated tubular collector 18 which is of a length sufficient to extend deep into the subsoil 12B below the root ball zone 12A and caps 20 are installed on the upper ends of collector portions 18. The portions 18 are shown truncated in FIGS. 3A, 3B.

Figure 4:
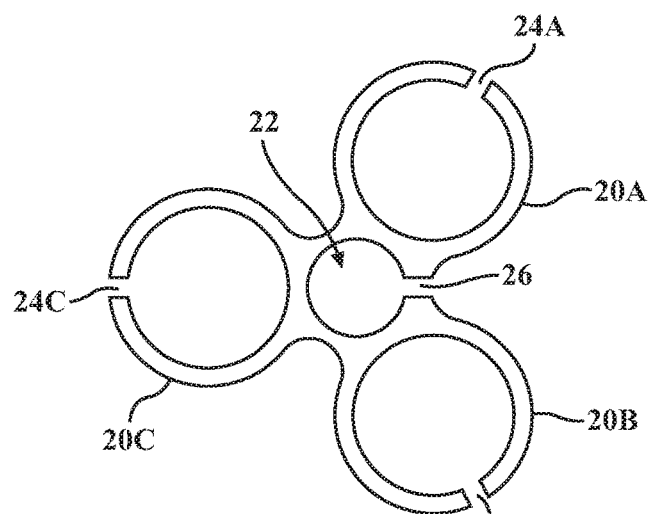
FIG. 4 is an enlarged end view of a vent member.
Figure 5:
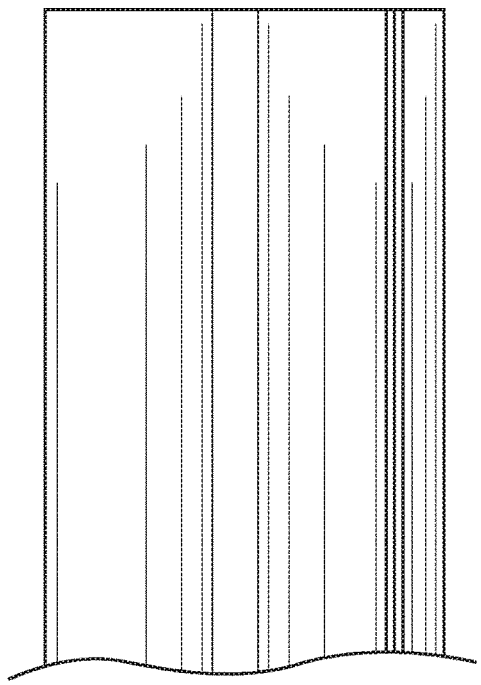
FIG. 5 is a side elevational view of the vent member shown in FIG. 4, shown broken at an intermediate point along the length thereof.

FIGS. 4 and 5 show the configuration of the tubular collectors 18, which includes three outer tube portions 20A, 20B, 20c which are connected integrally with each other and symmetrically arranged around a smaller diameter central tube portion 22 also integrally formed with the outer tube portions 20A, 20B, 20C.

Each of the outer tubes 20A, 20B, and 20C has a full length extending slot 24A, 24B, 24C at its outermost side so as to be exposed to the surrounding subsoil 12B. The smaller center tube 22 also has a full length slot 26 arranged between two of the outer tubes 20A, 20B so as to also be exposed to the surrounding subsoil 12B.

The presence of the slots 24A, 24B, 24C and 26 allow gaseous fluids and/or vapors captured in the surrounding subsoil 12B to pass into the interior of the outer tube portions 20A, 20B, 20C and center tube portion 24 to collect gases and/or vapors which subsequently rise up the same due to a mildly pressurized condition of these fluids.

Trace elements may be dissolved, entrained or otherwise contained in the gaseous fluid which typically is somewhat pressurized and thus rises up to pass into the interior of the cap 20.

Figure 6:
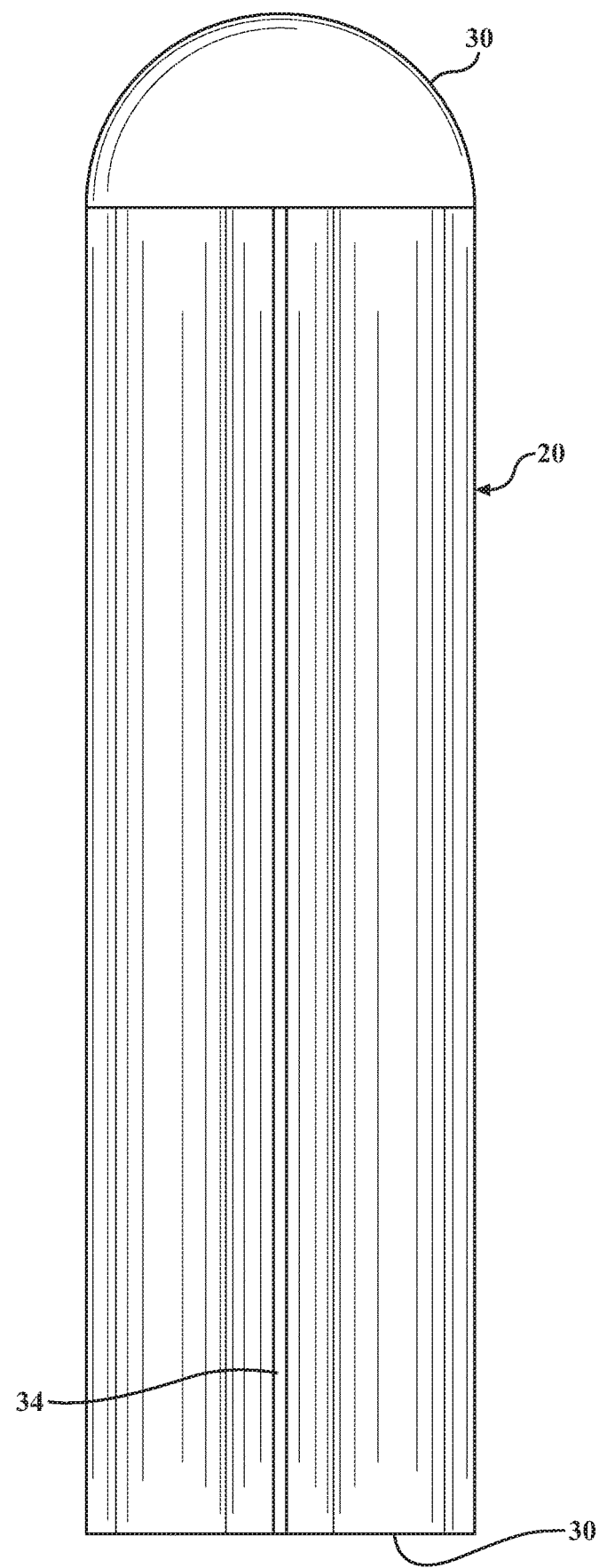
FIG. 6 is a side elevational view of a cap installed on the upper end of each vent member.
Figure 7:
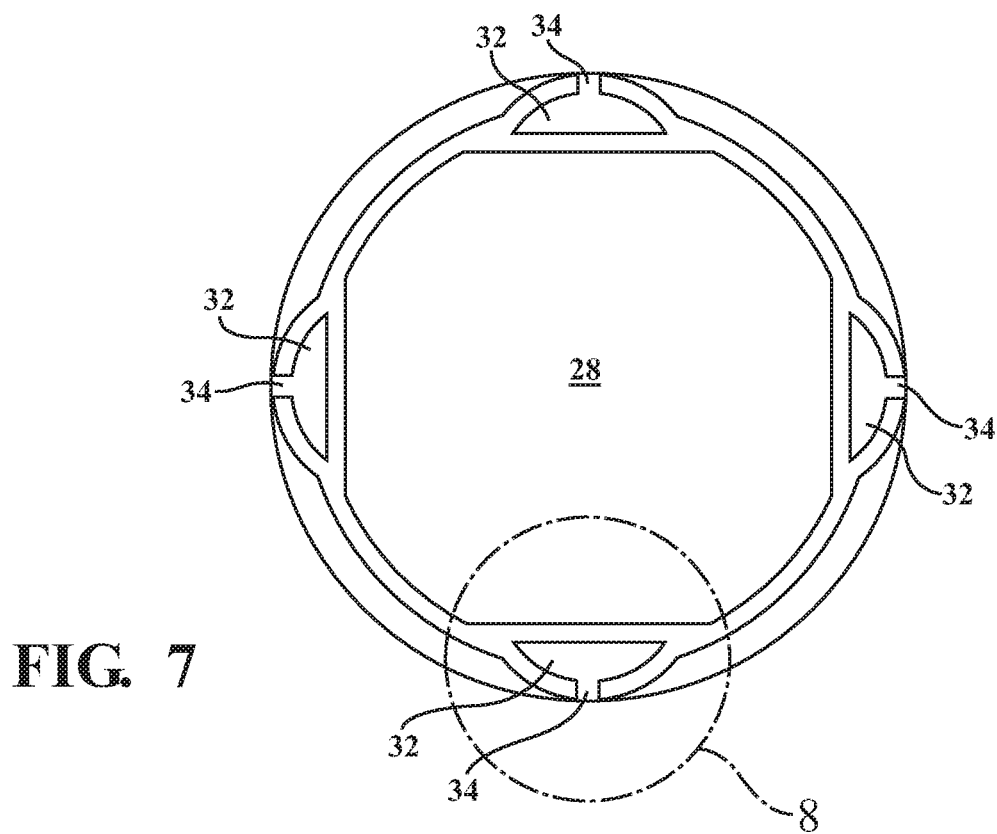
FIG. 7 is an end view from the bottom of the cap shown in FIG. 6.
Figure 8:
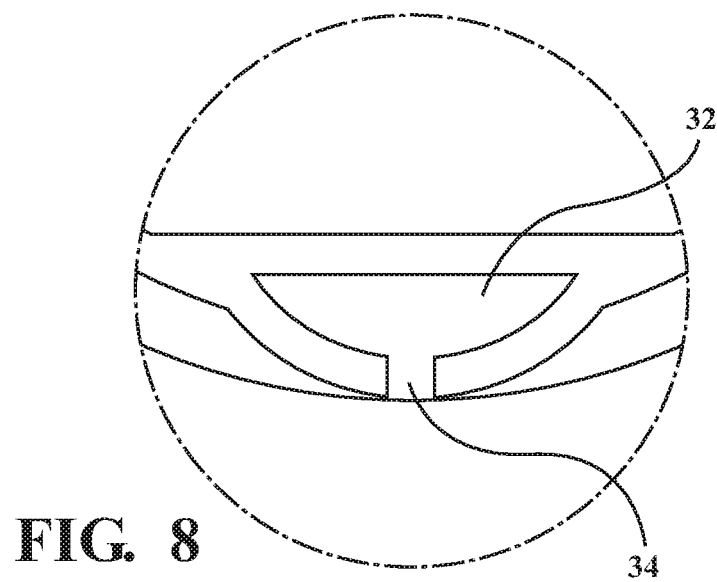
FIG. 8 is an enlarged portion of the bottom end view of the cap shown in FIG. 7.
Figure 9:
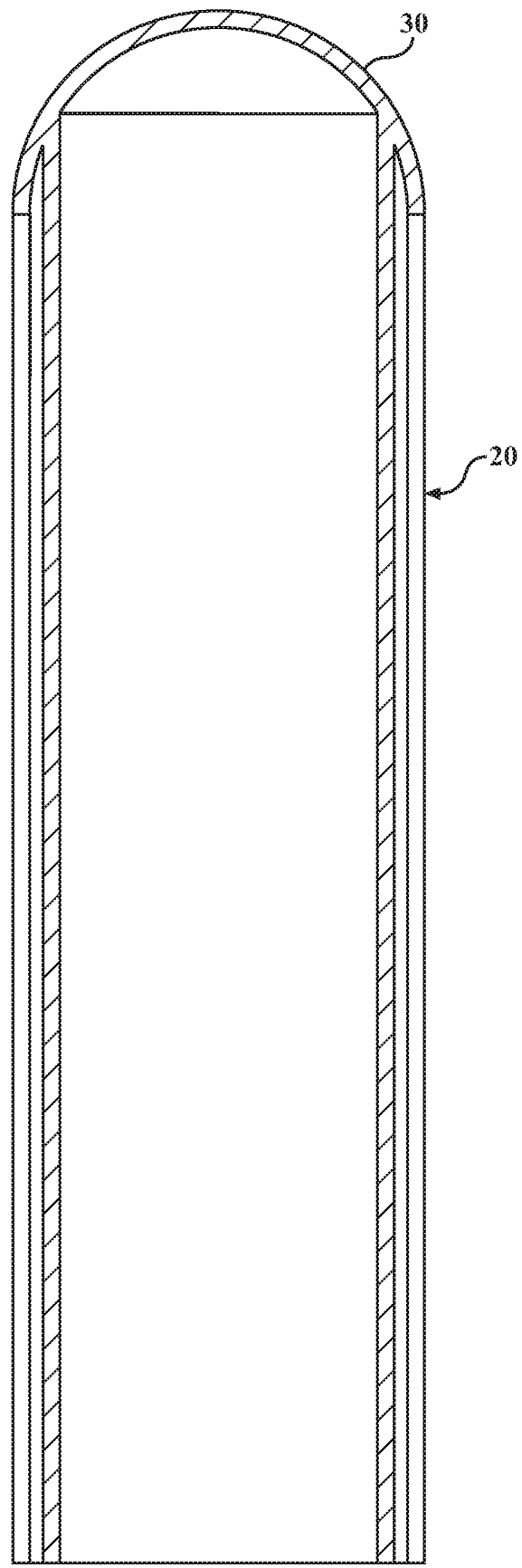
FIG. 9 is a lengthwise sectional view of the cap shown in FIGS. 6-8.

FIGS. 6-8 show details of the cap 20.

The cap 20 has an interior space 28 into which the collected gases/vapors, which is completely closed off from the exterior of the cap 20, being sealed by a cap cover 30 fused to the upper end of the cap 20 to capture the fluids flowing out of the ends of the tube portions 20A, 20B, 20C and 22 so that a corresponding pressure builds up therein.

This causes the fluids to be pass out of the cap interior space disposed between the lower end 30 of the cap 20 and the exterior of the associated tubular collector 18, and thereafter rises into the open lower ends of four outer spaces 32 which extend up on the outside of the cap 20. From there, the gaseous fluid rises up through the spaces 32, passing out of the slots 34 and into the soil 12A around the cap 20 to thereby be dispersed into the root zone soil 12A.

Accordingly, trace elements are thereby restored to the soil in the root zone 12A to be available to be absorbed by the roots of the trees 14. This has been found to significantly increase the vigor and growth rate of the trees 14.

The invention claimed is:

1. A method of introducing nutrients into soil in which trees are growing so as to increase the rate of growth of said trees, by comprising causing an upward movement of a gaseous fluid containing nutrients captured within a deep layer subsoil layer lying beneath a root zone layer of soil in which root balls of the trees are present and growing, comprising installing an array of elongated vent members extending vertically down within said deep layer subsoil and having an upper end entering into said root zone layer of the soil;

each vent member including an elongated tubular collector comprised of one or more tubes with a lengthwise slot opening into each one of said one or more tube portions allowing said gaseous fluid and nutrients contained therein to enter said one or more tube portions and rising upwardly therein;

said vent members including a cap fit over an upper end of said tubular collectors which has an interior space receiving said upper end of said tubular collectors said cap extending into said root zone layer, said cap interior space being sealed on the top of said cap to prevent the escape of any gaseous fluid entering an open lower end of said cap so that gaseous fluid entering said interior space will be forced to flow back out through said lower end of said cap about a perimeter thereof;

said cap further including lengthwise extending spaces formed in an exterior of said cap, open at lower ends thereof to receive said gaseous fluid flowing out of said lower end of said cap and allowing said gaseous fluid and nutrients to ascend within said exterior lengthwise spaces along said cap with each of said spaces having a lengthwise slot entering each cap space to allow said gaseous fluid and nutrients to exit out through said slots and into said root zone soil surrounding said cap to thereby slowly disperse one or more nutrients into said root zone layer soil and thereby increase said growth rate of said trees.

* * * * *